United States Patent
Feldman et al.

(10) Patent No.: US 11,280,420 B1
(45) Date of Patent: Mar. 22, 2022

(54) NORMALLY CLOSED VALVE HAVING A CLOSURE DELAY SYSTEM AND A METHOD THEREOF

(71) Applicant: COMETFLO LTD., Petach Tikva (IL)

(72) Inventors: Yoseph Feldman, Tel Aviv (IL); Emanuel Mendes, Petach Tikva (IL)

(73) Assignee: COMETFLO LTD., Petah Tikva (IL)

( * ) Notice: Subject to any disclaimer, the term of this patent is extended or adjusted under 35 U.S.C. 154(b) by 0 days.

(21) Appl. No.: 17/248,893

(22) Filed: Feb. 12, 2021

(30) Foreign Application Priority Data

Sep. 24, 2020 (IL) .......................................... 277616

(51) Int. Cl.
| | |
|---|---|
| *F16K 21/16* | (2006.01) |
| *F16K 3/28* | (2006.01) |
| *F16K 31/60* | (2006.01) |
| *F16K 31/48* | (2006.01) |

(52) U.S. Cl.
CPC ................ *F16K 21/16* (2013.01); *F16K 3/28* (2013.01); *F16K 31/48* (2013.01); *F16K 31/602* (2013.01)

(58) Field of Classification Search
CPC .......... F16K 21/16; F16K 21/04; F16K 21/06; F16K 21/10; F16K 31/48; F16K 31/602; F16K 3/28; F16K 31/485; E03D 1/30
USPC .................................. 251/15, 48, 64, 20, 23
See application file for complete search history.

(56) References Cited

U.S. PATENT DOCUMENTS

| | | | | |
|---|---|---|---|---|
| 4,008,541 A * | 2/1977 | Russer | ................... | A63H 33/20 446/51 |
| 4,290,603 A * | 9/1981 | Barnes | ................. | A63B 57/405 273/DIG. 25 |
| 4,981,160 A * | 1/1991 | Sen-Tein | ................. | F16K 21/10 137/550 |
| 7,975,980 B2 * | 7/2011 | Gao | ........................ | F16K 21/10 251/48 |
| 8,894,611 B2 * | 11/2014 | Larsen | .................... | A61M 5/24 604/111 |
| 9,267,608 B2 * | 2/2016 | Dutheil | ................... | F16K 21/10 |
| 2006/0202138 A1 * | 9/2006 | Yeh | ......................... | F16K 21/12 251/15 |

FOREIGN PATENT DOCUMENTS

| | | |
|---|---|---|
| CN | 87211500 U | 8/1988 |
| CN | 2046963 U | 11/1989 |

* cited by examiner

*Primary Examiner* — Craig J Price
*Assistant Examiner* — Andrew J Rost
(74) *Attorney, Agent, or Firm* — Wolter Van Dyke Davis, PLLC; Eugene J. Molinelli; Patrick Herron

(57) ABSTRACT

A normally closed valve according to the invention comprises a closure delay system utilizing the effect of vacuum on a flexible suction cup to generate a force that keeps the valve open when in an open orientation for a preset time period. The valve further comprises a closure delay mechanism including an actuator shaft and a suction cup disposed in a cavity, being configured for downward reciprocating movement, wherein the suction cup engages the cavity top wall when the valve is in closed orientation thereby closing the valve, and adhering to a suction surface of the cavity when the actuator shaft moves under pressure for switching the valve from closed to open orientation thereby opening the valve. The suction cup automatically disengages the suction surface a preset time period after pressure ceases to be applied to the actuator shaft and reengages the cavity top wall thereby closing the valve.

22 Claims, 3 Drawing Sheets

NORMALLY CLOSED VALVE HAVING A CLOSURE DELAY SYSTEM AND A METHOD THEREOF

FIELD OF THE INVENTION

The present invention, in some embodiments thereof, relates to a normally closed valve having a closure delay system. more particularly, but not exclusively, the invention relates to a normally closed valve including a closure delay system configured for delaying the closure of the valve for a preset time period, when in open orientation.

BACKGROUND OF THE INVENTION

A conventional valve is a mechanism for controlling flow of liquid for filling water tanks, such as those found in flush toilets, operating mechanisms which are controlled by a liquid flow, etc. Preferably, in the mechanism for controlling flow in a valve the period of time of the flow from actuation to closure can be preset and the valve can automatically close once the time has elapsed. This way, the time in which the liquid flows into the tank i.e. the quantity of liquid can be automatically controlled to avoid overflow. Similarly, the time in which a mechanism based on liquid flow is operative, can be automatically controlled. For example, a conventional valve for controlling the quantity of water filling water tanks consists of a valve which is engaged and disengaged by means of a pivotally mounted lever configured to close and open the valve, respectively. The lever typically comprises a rod, having a hollow sealed float often ball-shaped, mounted on one end, and a second end is placed in proximity to the valve so as to engage it when the float rises as the water level rises in the tank to a preset level, thereby applying pressure on the valve to close it and shut off the flow of the incoming water. Toward the end of the discharge process, the drop in water level lowers the float thereby disengaging the second end of the lever from the valve allowing it to open to the incoming water flow. Thus, these conventional valves mechanisms which rely on water level in a tank for operation must consist of relatively large floats in order to contact the water at a relatively large surface area, so that the rising water in the tank will create sufficient force on the lever to close the valve and shut off the water flow. Thus, such conventional valve mechanisms are cumbersome and require a tank and liquid in it for changing the valve from open to close orientation. They fail at times when the float frictionally engages a wall of the water tank or an overflow tube in the tank, preventing the float from rising and closing the valve, thus much water is wasted.

Water conservation is becoming more and more important. In response to the need for water conservation, it is imperative that the valve mechanism is reliable and failsafe to the highest degree particularly in respect of closure of the valve. It will be appreciated that water conservation includes prevention of water flow due to unreliable closure of valves that may cause waste of large quantities of water in view of their widespread use.

It is therefore a long felt need to provide a valve mechanism and method for controlling the flow of a quantity of liquid, which is of simple construction and small in size and that requires hardly any maintenance or replacement. And it would be very desirable to have such a device that provides failsafe and reliable operation.

BRIEF DESCRIPTION OF SEVERAL VIEWS OF THE DRAWINGS

Some embodiments of the invention are herein described, by way of example only, with reference to the accompanying drawings, in which.

Some embodiments of the invention are herein described, by way of example only, with reference to the accompanying drawings, in which.

In the several figures, like parts are given the same reference signs.

SUMMARY OF THE INVENTION

Figure 1:
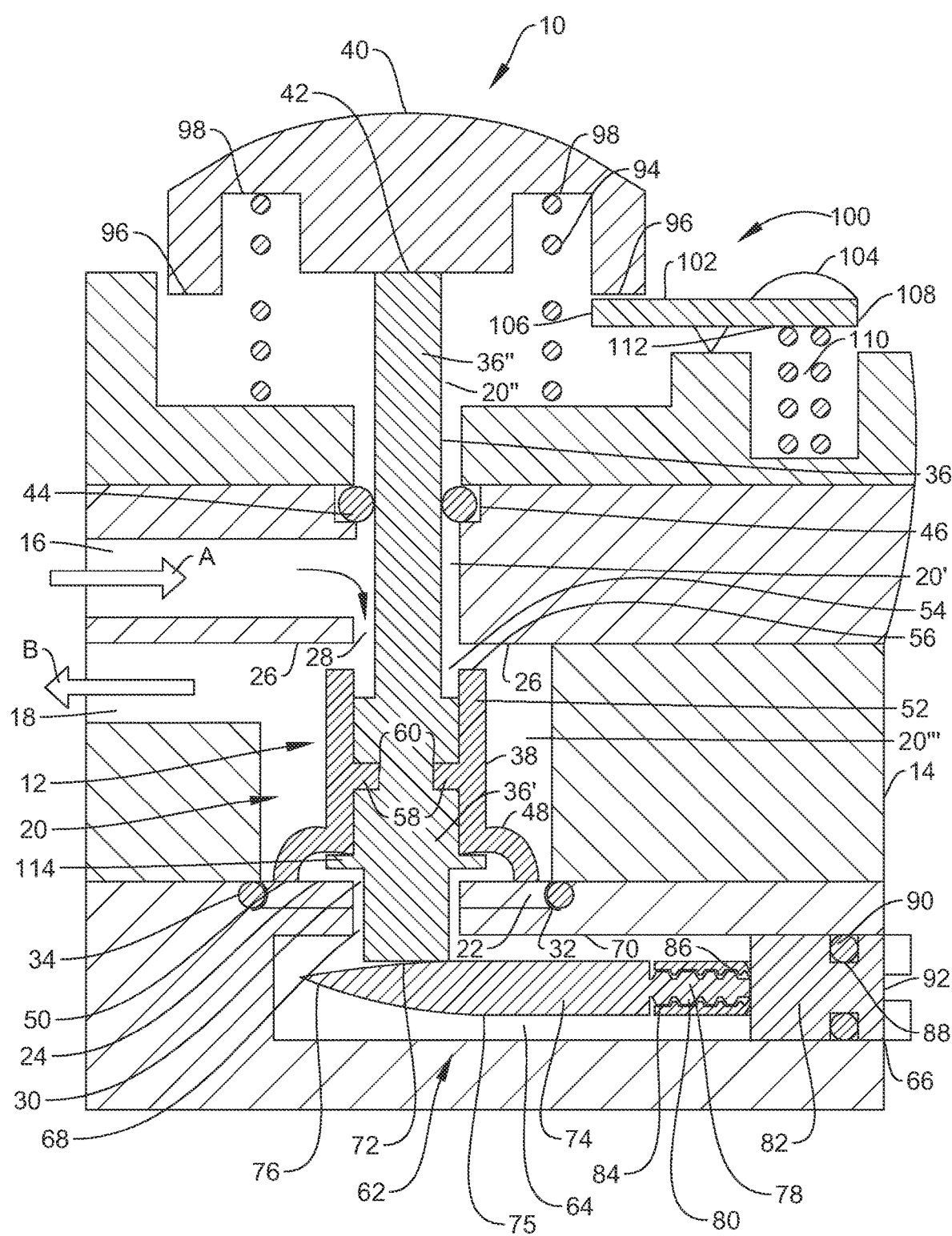
FIG. 1 is a sectional view of a normally closed valve having a mechanical closure delay system, constructed and operative in accordance with some embodiments of the present invention in an open orientation.

Introductory Overview:

The normally closed valves having a closure delay systems according to the present invention utilize the effect of vacuum on a flexible suction cup having a curved bell-like shaped wall to generate a force that acts to keep a normally-closed valve open when in an open orientation for a preset period of time thereby delaying closure of the valve. The invention will be described in that context.

A suction cup is a flexible object having a curved bell-like shaped wall having a soft sealable rim and some springiness to the cup when in a compressed orientation that forces it back to its original curved shape in its rest orientation. The working face of the suction cup is formed of elastic, flexible material such as elastomeric materials including but not limited to silicone rubber, and has a curved surface. Modern suction cups are made of highly flexible synthetic materials such as PVC plastic or neoprene. Prized for their reliability, these materials are preferred to natural rubber because they are stronger and more resistant to sunlight, abrasion and temperature extremes.

In particular, when a user applies pressure to the center of the suction cup against a relatively smooth, flat, rigid nonporous surface, the lower portion of the cup is compressed and the volume of the space between the suction cup and the flat surface is reduced, forcing the air or water between the cup and the surface to be expelled past the circular rim of the cup. The cavity which is created under the pressure between the cup and the flat surface has little to no air or water in it because most of the fluid has already been forced out of the cup, creating a vacuum or nearly vacuum in the cup. The pressure difference between the atmosphere on the outside of the cup and the vacuum or low-pressure in the cavity on the inside of the cup results in a suction force which keeps the cup adhered to the surface. The suction cup uses the suction force of the negative fluid pressure of air or water created by a vacuum or at least a partial vacuum.

When the user ceases to exert physical pressure to the outside of the cup, the elastic substance, which the cup is formed of and its resilience property, forces it back to reassume its original bell-like shape and disengage the surface. The length of time for which the suction effect on the cup is maintained before the cup fully reassumes its original shape, i.e. the speed in which it springs back to its bell-like shape or rest orientation and disengages the surface, depends mainly on how long it takes for air or water to leak back into the cavity between the cup and the surface, equalizing the pressure with the surrounding atmosphere. This is a function of the porosity and flatness of the surface, the properties of the material of the cup's rim and the degree to which the cup has been flattened, i.e. the size of the cavity between the cup and the surface thus the force of the negative pressure. The cup's resilience then tries to spring back to the curved shape, but since there is a seal between the surface and the cup's rim, the outside air cannot get back into the space between the surface and the inside of the cup and vacuum or partial vacuum is maintained therein. With no (or little) air within the cavity, ambient air will continue to press against the outside of the cup and the springiness or resilience of the cup, holding it against the surface.

Ideally, a suction cup should mate against a smooth, nonporous surface. Then, when vacuum is created the cup rim completely seals against atmospheric air and the interior air is quickly evacuated, resulting in a firm grip of the cup on the surface. However, surfaces of materials which are permeable, rough or uneven to a given degree may be selected to create non-ideal conditions whereby the suction cup cannot provide a complete seal thus the suction force is lower. The same is true when the working face of the suction cup is roughened to a given degree to create non-ideal conditions whereby the suction cup cannot provide a complete seal. In such a cases, the outside air continually enters the cavity under the suction cup, thereby causing it to spring back to the bell-like curved shape and disengage the surface at a time period which is shorter than when a smooth surface is used. It will be appreciated that one way in which to set the period of time for the suction cup to reassume its original shape is by selecting the material of the surface with a given degree of permeability or roughness or by selecting the degree of roughness of the working face of the suction cup, or both. Other ways in which to set this period of time is by selecting the material of the suction cup having a given degree of flexibility, which provides resilience to the cup when in a compressed orientation that forces it back towards its original bell-like shape and/or by adjusting the degree to which the cup is to be flattened, i.e. the size of the cavity volume between the cup and the surface. As will be described in detail below, optionally, the valve closure delay system according to the present invention may include a spring that is used to bias the actuator shaft in the open orientation of the valve forcing the suction cup back to its original curved shape and disengagement from the surface. The period of time delay can be preset by selection of a spring having a given recoil strength.

The valve according to the present invention utilizes a suction force created in a suction cup to delay the closure of the valve for a preset period of time, which is required for the vacuum or little air in the cavity under the suction cup to equalize with the atmospheric pressure of the ambient air, allowing the suction cup to spring back to its original shape, disengage from the surface and close the valve. Thus, the closure delay is used to keep the valve open for a preset period of time.

The suction cup according to the present invention may be formed, for example, of elastic, flexible material such as elastomeric materials including but not limited to silicone rubber, highly flexible synthetic materials such as PVC plastic or neoprene, and has a curved wall.

In preferred embodiments according to the present invention, the valve having a closure delay system includes a housing including a liquid inlet chamber defined in the housing, a liquid outlet chamber defined in the housing, a passage defined in the housing between the inlet and the outlet chambers, and a cavity defined in the housing having a suction surface; a suction cup and an actuator shaft fixedly coupled substantially to the center of the suction cup, and disposed in the cavity; and a sealing member disposed in the cavity in sealing engagement with the actuator shaft and the wall of the cavity. In preferred embodiments of the invention, the normally closed valve having a closure delay system may include a spring element for biasing the actuator shaft in the open orientation of the valve driving it back to the normally-closed orientation or rest position. When a user applies pressure to the actuator shaft it moves longitudinally downward, compressing the center of the suction cup and flattening it so that the suction cup engages the suction surface and adheres to it thereby holding the valve in an open orientation. The valve is kept open for the time required for the suction cup to automatically spring back to its original bell-like shape, disengage the suction surface thus returning the valve back to the its normally-closed orientation.

In preferred embodiments of the invention, the valve closure delay system includes an adjusting mechanism, which permits a user to adjust the time duration in which the suction cup engages the suction surface and adheres to it before reassuming its original bell-like curved shape thus the period of time during which closure of the valve is being delayed.

Additionally, the present invention relates to a normally-closed valve having a closure delay system, comprising a housing including a liquid inlet chamber defined in the housing including an inlet opening in the outside wall of the housing, a liquid outlet chamber defined in the housing having an outlet opening in the outside wall of the housing and a passage defined in the housing between inlet and outlet chambers. The valve further includes a cavity defined in the housing in flow communication with the inlet chamber, outlet chamber and passage when the valve is in open orientation, wherein the cavity comprises a bottom wall having a top suction surface and a cavity top wall; a closure delay mechanism comprising an actuator shaft having a lower portion and an upper portion, and a suction cup, the actuator shaft lower portion fixedly coupled to the suction cup and the suction cup being adapted and configured to open and close the passage; wherein the actuator shaft and suction cup are disposed in the cavity being adapted and configured for longitudinally downward reciprocating movement of the actuator shaft and suction cup therein; and wherein the suction cup is sealingly engaging the cavity top wall when the valve is in the normally-closed orientation thereby closing the passage; disengaging the cavity top wall and engaging the top suction surface and adhering thereto when the actuator shaft moves longitudinally downward by pressure applied thereto for switching the valve from normally-closed orientation to open orientation thereby opening the passage; automatically disengaging the top suction surface a preset time period after pressure cease to be applied to the actuator shaft and sealingly reengaging the cavity top wall thereby closing the passage and switching the valve from open orientation to normally-closed orientation.

According to some embodiments of the invention, the suction cup further includes a flexible, resilient lower portion having a bell-like shape curved wall configured to engage the top suction surface and adhering thereto and a neck upper portion having a top rim being configured to sealingly engage and disengage the cavity top wall.

According to some embodiments of the invention, the bell-like shape curved wall is having a soft sealable bottom rim ending.

According to some embodiments of the invention, the neck upper portion is having a neck opening defined by the inside wall of the neck upper portion, sized and configured for receiving the actuator shaft lower portion for affixed coupling to substantially the center of the suction cup.

According to some embodiments of the invention, the cavity further comprises a cavity first upper portion in flow communication with the inlet chamber; a cavity second upper portion separated from the cavity first upper portion by an actuator seal disposed therebetween; and a cavity lower portion including the cavity bottom wall and the cavity top wall; wherein the cavity first upper portion, the cavity lower portion, the inlet chamber, the outlet chamber and the passage are in flow communication when the valve is in open orientation.

According to some embodiments of the invention, the cavity bottom wall is configured for replacement by a cavity bottom wall the top suction surface texture of which is selected from a group consisting of flat, smooth, nonporous, porous, rigid, permeable, rough or uneven textures, wherein each said top suction surface texture provides a different degree of adherence of the suction cup to the top suction surface, resulting in different periods of time for the suction cup to reassume its original bell-like curved shape in the rest position thus the valve to close, and wherein the cavity bottom wall includes a circumferential groove for holding a cavity seal disposed therein for sealing the cavity lower portion.

According to some embodiments of the invention, the closure delay mechanism further comprises an actuation button fixedly coupled to the actuator shaft upper portion or integrally formed therewith, and projecting from the cavity second upper portion for applying pressure to the actuation shaft when switching the valve from the normally-closed orientation to the open orientation.

According to some embodiments of the invention, the cavity bottom wall include a bottom opening.

According to some embodiments of the invention, the closure delay mechanism further comprises an actuator coil spring having a first end seated in or on the housing and a second end engaging actuation button, wherein the actuator coil spring is biased when pressure is applied to actuation button to switch the valve from normally-closed orientation to open orientation thereby generating a recoil tension urging the closure delay mechanism to return to an original rest position and the valve to normally-closed orientation.

According to some embodiments of the invention the closure delay system further includes a closure delay adjusting mechanism for adjusting the longitudinal downward distance of movement of the actuator shaft in the cavity prior to actuation, thereby adjusting the valve closure delay time, the delay adjusting mechanism including an adjustment rod having a tapered portion a non-tapered portion and a cylindrical coupling shank, wherein the coupling shank includes external screw threads; an adjusting body including a cylindrical complementary coupling slot, the coupling slot including an internal wall having screw threads matching the coupling shank external screw threads, for coupling the adjusting body to the coupling shank, the adjusting body configured to be rotated; wherein the closure delay adjusting mechanism is disposed in a tunnel defined in a lower portion of the housing, extending substantially horizontally from an adjustment opening in the outside wall of the housing to a point substantially under the bottom opening of the cavity bottom wall, the tunnel having a tunnel opening in an upper wall of the tunnel, in registration with the bottom opening, sized and configured for allowing actuator shaft lower portion to move reciprocally through the tunnel opening for abutting the adjustment rod when the valve is actuated to switch from normally-closed orientation to open orientation; and wherein the tapered portion is positioned under the tunnel opening by rotating the adjusting body in a first direction, thereby allowing the actuator shaft to move longitudinally downward a longer distance thus exerting greater compression to the suction cup, than when a non-tapered portion is positioned under the tunnel opening by rotating the adjusting body in a direction opposite to the first direction, thereby increasing the time period of the closure delay of the valve.

According to some embodiments of the invention, the closure delay system further includes a deactivating mechanism including a deactivating lever, the lever being pivotally mounted in or on the housing, wherein a first end of the deactivating lever extends under the actuation button, and wherein applying pressure to a second end of the deactivating lever when the valve is in open orientation, the first end of the deactivating lever configured to operatively engage and push against actuation button thereby overcoming the suction force adhering the suction cup to the top suction surface urging the valve to return to its normally-closed orientation.

According to some embodiments of the invention, the valve having a closure delay system further includes at least one recess defined in actuator shaft lower portion and at least one inward protrusion defined in the suction cup and configured to be seated in the recess for firmly affixing the suction cup to the actuator shaft. According to some embodiments of the invention, the recess is being circumferentially defined in the actuator shaft lower portion and the inward protrusion being circumferentially inwardly defined in the suction cup and configured to be seated in the circumferential recess and wherein the inward protrusion is being integrally formed with the suction cup.

According to some embodiments of the invention, the valve having a closure delay system further includes a support flange defined in the actuation shaft lower portion and disposed inside the suction cup, the support flange is configured to push up the suction cup to sealingly engage the cavity top wall when the suction cup springs back to its original bell-like shape or when pressure is applied to the deactivation lever, thereby closing the valve.

According to some embodiments of the invention, the valve having a closure delay system further includes a closure delay adjusting mechanism for presetting the longitudinal position of the actuator shaft in the cavity prior to actuation, thereby adjusting the valve closure delay time, the delay adjusting mechanism including a cylindrical adjusting head including external screw threads, cylindrical adjusting head being fixedly coupled to the actuator shaft upper portion, and a cylindrical sleeve including internal screw threads complementary to the external screw threads of the adjusting head for rotational coupling thereto, the cylindrical sleeve being disposed in the actuation button, wherein the cylindrical adjusting head is rotationally disposed in the cylindrical sleeve and so configured that when the cylindrical adjusting head is rotated relative to the actuation button in a first direction the actuator shaft moves longitudinally downward in the cavity and is positioned lower therein than when cylindrical adjusting head is rotated in a direction opposite the first direction thereby moving actuator shaft upwardly in the cavity and is positioned higher therein, thereby exerting greater compression to the suction cup thus increasing the closure delay time of the valve.

There is also provided according to the invention, a method for delaying closure of a normally-closed valve having a closure delay system, the method including providing a housing; defining in the housing a liquid inlet chamber including an inlet opening in the outside wall of the housing, a liquid outlet chamber having an outlet opening in the outside wall of the housing, a passage between the inlet and outlet chambers and a cavity comprising a bottom wall having a top suction surface and a cavity top wall, wherein the cavity is in flow communication with the inlet chamber, outlet chamber and passage when the valve is in open orientation; providing a closure delay mechanism comprising an actuator shaft having a lower portion and an upper portion, and a suction cup; fixedly coupling the actuator shaft lower portion to the suction cup wherein the suction cup is adapted and configured to open and close the passage; disposing the actuator shaft and suction cup in the cavity wherein the cavity is adapted and configured for longitudinal downward reciprocating movement of the actuator shaft and suction cup therein; sealingly engaging the cavity top wall by the suction cup when the valve is in the normally-closed orientation; moving the actuator shaft longitudinally downward by applying pressure to the actuator shaft when switching the valve from normally-closed orientation to open orientation, wherein the suction cup disengages the cavity top wall, engages the top suction surface and adheres thereto thus opening the passage; and automatically disengaging the suction cup from the top suction surface a preset time period after pressure is ceased to be applied to the actuator shaft, wherein the suction cup sealingly reengages the cavity top wall thereby closing the passage thus switching the valve from open orientation to normally-closed orientation.

According to embodiments of the invention, the method for delaying closure of a normally-closed valve having a closure delay system further includes providing a closure delay adjusting mechanism for adjusting the longitudinal downward distance of movement of the actuator shaft in the cavity prior to actuation, thereby adjusting the valve closure delay time, wherein the closure delay adjusting mechanism includes an adjustment rod having a tapered portion, a non-tapered portion and a cylindrical coupling shank, the coupling shank including external screw threads; providing an adjusting body having a cylindrical complementary coupling slot, the coupling slot including an internal wall having screw threads matching the coupling shank external screw threads for coupling the adjusting body to the coupling shank, wherein the adjusting body is configured to be rotated; disposing the closure delay adjusting mechanism in a tunnel defined in a lower portion of the housing, the tunnel extending substantially horizontally from an adjustment opening in the outside wall of the housing to a point substantially under a bottom opening in the cavity bottom wall, wherein the tunnel is having a tunnel opening in an upper wall of the tunnel, in registration with the bottom opening; moving actuator shaft lower portion reciprocally through the tunnel opening for abutting the adjustment rod when the valve is actuated to switch from normally-closed orientation to open orientation; positioning prior to actuation the tapered portion under the tunnel opening by rotating the adjusting body in a first direction, thereby allowing the actuator shaft to move longitudinally downward a longer distance than when the non-tapered portion is positioned under the tunnel opening by rotating the adjusting body in a direction opposite the first direction; and exerting greater compression to the suction cup thereby increasing the time period of the closure delay of the valve.

According to other embodiments of the invention, the method for delaying closure of a normally-closed valve having a closure delay system further includes providing a closure delay adjusting mechanism for presetting the longitudinal position of the actuator shaft in the cavity prior to actuation, thereby adjusting the valve closure delay time, the closure delay adjusting mechanism includes a cylindrical adjusting head including external screw threads, the cylindrical adjusting head being fixedly coupled to the actuator shaft upper portion; a cylindrical sleeve including internal screw threads complementary to the external screw threads of the adjusting head for rotational coupling thereto, the cylindrical sleeve being disposed in the actuation button; rotationally disposing the cylindrical adjusting head is in the cylindrical sleeve; moving the actuator shaft longitudinally downward in the cavity by rotating the cylindrical adjusting head relative to the actuation button in a first direction, thereby positioning the actuator shaft prior to actuation lower in the cavity, than when moving actuator shaft upwardly in the cavity by rotating the cylindrical adjusting head relative to the actuation button in a direction opposite to the first direction, thereby positioning the actuator shaft higher in the cavity; and exerting greater compression to the suction cup thereby increasing the time period of the closure delay of the valve.

The method according to preferred embodiments of the present invention, involves providing a housing including a liquid inlet chamber defined in the housing, a liquid outlet chamber defined in the housing, a passage defined in the housing between the inlet and outlet chambers, and a cavity defined in the housing having a suction surface; providing a suction cup and an actuator shaft fixedly coupled substantially to the center of the suction cup, and disposed in the cavity; and providing a sealing member disposed in the cavity in sealing engagement with the actuator shaft and the wall of the cavity. In preferred embodiments of the invention, the method may include providing a spring element biasing the actuator shaft to retract to the normally-closed non-operational mode or rest orientation when the combined effect of the spring biasing force, resilience property of the suction cup which forces it back to reassume its original bell-like curved shape, and air or liquid leaking back into the cavity between the suction cup and the suction surface of the housing, is sufficient to overcome the suction force adhering the suction cup to the suction surface. When a user applies pressure to the actuator shaft it compresses the center of the suction cup and flattens it so that it engages the suction surface and adheres to it thus holding the valve in an open orientation. The valve is kept open for the period of time required for the suction cup to spring back to its original shape and disengage the suction surface thus driving the valve back to the normally-closed orientation.

According to embodiments of the invention, the invention also provides a method of delaying the closure of a normally-closed valve for a preset time period when in open orientation thereby controlling the amount liquid flowing through the valve. The method according to embodiments of the present invention utilizes a suction cup and the effect of the pressure difference between the atmosphere on the outside of the suction cup and the vacuum or low-pressure in the cavity formed between the cap and the suction surface to create a suction force, i.e. a negative fluid pressure of air or water, when the center of the suction cup is depressed against a suction surface, to keep the suction cup engaged to the suction surface and adhered to it thereby keeping the valve in the open orientation and delaying the return of the valve to the normally-closed orientation for the preset time period.

The valve having a closure delay system according to the present invention is characterized by simplicity, compactness, low cost, long-term reliability, and fail-safe operation. Systems and devices in which the mechanical closure delay system according to the present invention can be used, are toilets, faucets and industrial process of various kinds that require automatic mechanical closure which is delayed for a preset time period in order to control the amount of liquid flow into a vessel.

Unless otherwise defined, all technical and/or scientific terms used herein have the same meaning as commonly understood by one of ordinary skill in the art to which the invention pertains. In case of conflict, the patent specification, including definitions, will control. In addition, the materials, methods, and examples are illustrative only and are not intended to be necessarily limiting.

DETAILED DESCRIPTION OF ILLUSTRATIVE EMBODIMENTS OF THE INVENTION

Embodiments of the Invention

Referring now to the drawings, FIG. 1 illustrates a preferred embodiment of a normally-closed valve having a closure delay system and method according to the present invention and the principles underlying thereof, in an open orientation. A normally-closed valve having a closure delay system is indicated in FIG. 1, generally by the reference character 10. A closure delay mechanism is indicated generally by the reference character 12. Closure delay valve 10 of the preferred embodiments comprises a housing 14 including a liquid inlet chamber 16 defined in the housing having an inlet opening in the outside wall of the housing, a liquid outlet chamber 18 defined in the housing having an outlet opening in the outside wall of the housing and a passage 28 defined in the housing therebetween, all in flow communication in the open orientation of the valve. In FIG. 1 arrow "A" indicates inflow of liquid into the valve and arrow "B" indicates outflow of liquid from the valve. Housing 14 further includes a cavity 20 defined in the housing having a cavity first upper portion 20' in flow communication with inlet chamber 16, a cavity second upper portion 20" separated from cavity first upper portion 20' by an actuator seal 44, and a cavity lower portion 20''' in flow communication with outlet chamber 18. Cavity lower portion 20''' comprises a cavity bottom wall 22 having a top suction surface 24 and a cavity top wall 26. Cavity first upper portion 20' and cavity lower portion 20''' are in flow communication through passage 28 in open orientation of the valve. Optionally, cavity bottom wall 22 may include a bottom opening 30. Additionally, cavity 20 is adapted and configured to hold closure delay mechanism 12 disposed therein. Optionally, cavity bottom wall 22 may be configured for replacement by another cavity bottom wall selected from a group consisting of cavity bottom walls having different top surface textures. Additionally, cavity bottom wall 22 may include a circumferential groove 32 for holding a cavity seal 34 disposed therein for sealing cavity lower portion 22'''.

Closure delay mechanism 12 includes an actuator shaft 36 having a lower portion 36' and an upper portion 36", a suction cup 38 and an actuation button 40. Actuator shaft lower portion 36' is fixedly coupled substantially to the center of suction cup 38 and actuation button 40 is fixedly coupled to an upper end 42 of the actuator shaft. Actuator shaft 36 is disposed in cavity 20 wherein actuator shaft lower portion 36' and suction cup 34 affixed thereto are disposed in cavity lower portion 20''' and actuator shaft upper portion 36" is disposed in cavity first and second upper portions 20' and 20", respectively, whereas actuation button 40 affixed to the actuator shaft upper end 42 projects outside cavity second upper portion 20". Additionally, cavity first and second upper portions 20' and 20", respectively, are adapted and configured for disposing therebetween actuator seal 44 in sealing engagement with the peripheral wall of actuator shaft 36 and with inner wall 46 of cavity 20 at a point where actuator seal 44 seals liquid passage between the cavity first upper portion and the cavity second upper portion yet allows cavity first upper portion 20' to be in flow communication with inlet chamber 16 in open and closed orientations of the valve and with outlet chamber 18 only in open orientation of the valve.

Suction cup 38 comprises a flexible, resilient lower portion having a bell-like shape curved wall 48 illustrated in FIG. 1 in a deformed flattened shape when it is compressed by the actuator shaft in an open orientation of the valve. Wall 48 of the suction cup ends in a soft sealable bottom rim 50. Wall 48 provides a certain degree of springiness to the suction cup in the compressed orientation so that when the suction force adhering the suction cup to the suction surface is diminished and overcome by the resilience of suction cup wall 48, said springiness forces the suction cup back to its original bell-like curved shape in the rest orientation. Suction cup 38 further comprises an upper portion neck 52 having a neck opening 54 defined by the inside wall of neck upper portion 52 which is sized and configured for receiving actuator shaft lower portion 36' for affixed coupling to substantially the center of suction cup 38. A top rim 56 of upper portion neck 52 is configured and sized for sealing engagement with cavity top wall 26 in the closed orientation of the valve (not shown). Bottom rim 50 of the suction cup is made of elastic, flexible material such as elastomeric materials including but not limited to silicone rubber.

Preferably, actuator shaft 36 may include at least one recess 58 defined in lower portion 36' and at least one inward protrusion 60 defined in suction cup 38 configured to be seated in recess 58 for firmly affixing the suction cup to the actuator shaft. Optionally, recess 58 may be circumferentially defined in actuator shaft 36 and inward protrusion 60 may be circumferentially inwardly defined in suction cup 38 and configured to be seated in circumferential recess 58. Optionally, protrusion 60 may be integrally formed with suction cup 38.

It will be appreciated by those skilled in the art that for best adherence of a suction cup when compressed to a surface, thus for longest period of time for the suction cup to return to its original bell-like shape in the rest orientation, both the suction surface and the bottom rim of the suction cup need to be as smooth and nonporous as possible. However, according to preferred embodiments of the present invention, top suction surface 24 of cavity bottom wall 22 or the bottom rim 50 of suction cup 38, or both, may comprise a top surface texture selected from a group consisting of flat, smooth, nonporous, porous, rigid, permeable, rough or uneven, at a given degree. Each such surface texture may provide a different degree of adherence of the suction cup to top suction surface 24, resulting in different periods of time for the suction cup to return to its original bell-like curved shape in the rest position, thereby forcing the actuator shaft to retract to the rest position thus the valve to close. Hence, according to the present invention the time period of the closure delay of the valve, can be preset by mere selection of the top suction surface texture of the cavity bottom wall or of the surface of the bottom rim of the suction cup or both, or in combination with other means as will be further illustrated and described below.

In the normally closed orientation of the valve according to an embodiment of the present invention (not shown in FIG. 1 but illustrated in FIG. 3 and described in detail below), top rim 56 of suction cup 38 sealingly engage cavity top wall 26 when in relaxed bell-like curved shape orientation, thereby sealing passage 28 between cavity lower portion 20''' and cavity first upper portion 20', preventing flow communication between inlet chamber 16 and outlet chamber 18, thus closing the valve.

To switch the delay valve according to an embodiment of the present invention from normally-closed to open orientation, a user applies pressure to actuation button 40 thereby pressure is applied to actuator shaft 36 causing it to move longitudinally downward and compress the center of suction cup 38 thus flattening lower portion 48 of the suction cup so that bottom rim 50 of the suction cup engages top suction surface 24 of cavity bottom wall 22 and adheres to it. In this position of the suction cup, top rim 56 of the suction cup is disengaged from the top wall 26 of the cavity lower portion 20' thereby opening passage 28 and inflow of liquid "A" can flow from a source (not shown) into inlet chamber 16, through passage 28 into outlet chamber 18, and outflow of liquid "B" can flow out of the valve. When the user ceases to apply pressure to the actuation button 40, the valve is kept in open orientation for the preset period of time required for suction cup 38 to automatically spring back to its original bell-like shape. During this period of time, the closure of the valve is delayed for the preset period of time and liquid can flow through the valve. It will be appreciated that the period of time during which the closure of the valve is delayed determines the quantity of water flowing through the valve. When suction cup 38 springs back and reassumes its original bell-like curved shape top rim 56 of the suction cup is configured to disengage top suction surface 24 and sealingly reengage cavity top wall 26, thereby sealing passage 28, and the valve is back to normally-closed orientation wherein the liquid flow through the valve is stopped.

It will be appreciated by those skilled in the art that one way of presetting the time delay of the valve closure according to an embodiment of the invention, is by configuring the actuator shaft 36 longitudinal downward reciprocating movement in cavity 20 when a user applies pressure to actuation button 40. The lower actuator shaft 36 is configured to move the stronger is the adherence of suction cup 38 to top suction surface 24 thus a longer period of time is required for suction cup 38 to spring back and reassumes its original bell-like curved shape, thereby automatically disengage top suction surface 24 and sealingly reengage cavity top wall 26, thus the longer is the period of time the closure of the valve is being delayed. Accordingly, in order to determine the longitudinal downward reciprocating movement of actuator shaft 36, optionally the delay valve according to preferred embodiments of the invention may include a closure delay adjusting mechanism indicated generally by the reference character 62, for adjusting the longitudinal distance of motion of actuator shaft 36 thereby adjusting the delay period of time.

Delay adjusting mechanism 62 is disposed in a tunnel 64 defined in a lower portion of housing 14, extending substantially horizontally from an adjustment opening 66 in the outside wall of housing 14 to a point substantially under bottom opening 30 in bottom wall 22 of cavity lower portion 20'''. Tunnel 64 having a tunnel opening 68 in an upper wall 70 of tunnel 64, in registration with bottom opening 30 in bottom wall 22. Tunnel opening 68 is sized and configured for a bottom end 72 of actuator shaft 36 to move reciprocally through tunnel opening 68 for abutment with adjusting mechanism 62 when valve 10 is actuated to switch from normally-closed orientation to open orientation. Adjusting mechanism 62 comprises an adjustment rod 74 having a tapered portion 76, a non-tapered portion 75 and a cylindrical coupling shank 78. Coupling shank 78 comprises external screw threads 80. Adjusting mechanism 62 further comprises an adjusting body 82 including a cylindrical complementary coupling slot 84. The internal wall of coupling slot 84 includes internal screw threads 86 matching external screw threads 80 for coupling adjusting body 82 to coupling shank 78. The coupling shank and the coupling slot are configured so that when adjusting body 82 is rotated in a first direction, coupling shank 78 moves into coupling slot 84 thereby placing tapered portion 76 of rod 74 under tunnel opening 68 prior to actuation, and when rotated in the direction opposite to the first direction, coupling shank 78 moves out of coupling slot 84 thereby placing non-tapered portion 75 of rod 74 under tunnel opening 68, prior to actuation. Optionally, body 82 may include a circumferential groove 88 for holding an adjusting seal 90 disposed therein, for sealing tunnel 64. Adjusting body 82 may further include at a groove 92 configured to allow for rotating body 82 by means of a screw driver, thus causing reciprocal movement of adjustment rod 74.

Preferably, in order to adjust the valve so as to increase the closure delay time of the valve according to an embodiment of the present invention, adjustment mechanism 62 is configured to allow actuator shaft 36 to move longitudinally downward in the cavity for a longer distance. This is accomplished by rotating adjusting body 82 in a first direction which drives adjustment rod 74 closer to adjusting body 82 so that tapered portion 76 is positioned under tunnel opening 68, prior to actuation. It will be appreciated that at this position of the adjustment rod 74 when pressure is applied to actuation button 40, actuator shaft 36 can move longitudinally downward through bottom opening 30 and tunnel opening 68 until its bottom end 72 abuts tapered portion 76, for a longer distance than when the adjusting body 82 is rotated in the opposite direction which drives adjustment rod 74 away from adjusting body 82 so that non-tapered portion 75 is positioned under tunnel opening 68, prior to actuation. In the first case, the longer motion of actuator shaft 36 exerts greater compression to suction cup 38 against top suction surface 24 and as a result a stronger adherence of the suction cup to the suction surface.

Such stronger adherence provides for a longer time for the suction cup to return to its bell-like curved shape, thus the closure of the valve is delayed for a longer time.

In open orientation of the valve, the degree of flatness of the suction cup as a result of compression by the actuator shaft determines the force of adherence of the suction cup to the suction surface, thereby the period of time that is required for the suction cup to reassume its bell-like curved shape, thus the period of time that the valve remains in open orientation. As described above, the closure delay time of the valve according to the present invention can be adjusted by the adjusting mechanism.

Optionally, according to preferred embodiments of the invention, delay mechanism 12 may include an actuator coil spring 94 having a first end seated in housing 14 and a second end engaging bottom wall 96 of actuation button 40. Optionally, actuation button 40 may comprise a groove 98 for seating second end of actuator coil spring 94 therein. When pressure is applied to actuation button 40 actuator coil spring 94 is biased thereby applying a recoil tension to closure delay mechanism 12 urging it to return to the original rest position and the valve to the normally-closed orientation. When the combined effect of: the recoil force of actuator coil spring 94; the resilience property of suction cup 38; the air or liquid leaking back into the cavity between the suction cup and top suction surface 24 of cavity bottom wall 22; is sufficient to overcome the suction force adhering the suction cup to the suction surface, the closure delay mechanism will automatically return to the original non-operational position and the valve to the normally-closed orientation. It will be appreciated by those skilled in the art that according to preferred embodiments of the invention, one way in which to preset the period of time for the suction cup to reassume its original shape, i.e. the delay period of time of the valve, is by selecting the degree of the recoil force of actuator coil spring 94. The larger the recoil force of the coil spring the shorter the closure delay time.

Optionally, according to preferred embodiments of the present invention, delay valve 10 may further include a deactivating mechanism indicated in FIG. 1 generally by the reference character 100, comprising a deactivating lever 102, the lever being pivotally mounted in or on housing 14. A first end 106 of lever 102 extends under bottom wall 96 of actuation button 40, and a second end 108 of lever 102 includes a push button 104 affixed thereto. When a user desires to close the valve in open orientation, he or she may apply pressure to button 104 causing second end 108 of deactivating lever 102 to operatively engage and push against bottom wall 96 thereby overcoming the suction force adhering suction cup 38 to top suction surface 24. Thus, urging actuator shaft 36 to retract to its original position, top rim 56 of suction cup 38 to sealingly reengage cavity top wall 26, and the valve to reassume its normally-closed orientation.

Optionally, deactivating mechanism 96 may include a deactivating coil spring 110 having a first end seated in housing 14 and a second end engaging a bottom wall 112 of deactivating lever 102, biasing the lever to retract to its original non-operative position when the user ceases to apply pressure to button 104.

Optionally, actuator shaft 36 may include a support flange 114 defined in the actuation shaft lower portion 36', disposed inside suction cup 38 and configured for pushing up the suction cup to sealingly engage cavity top wall 26 thereby sealing passage 28, when the suction cup is springing automatically back to its original bell-like shape or when pressure is applied by the user to push button 104, thereby urging actuator shaft 36 to retract to its non-operation position thus closing the valve.

Figure 2:
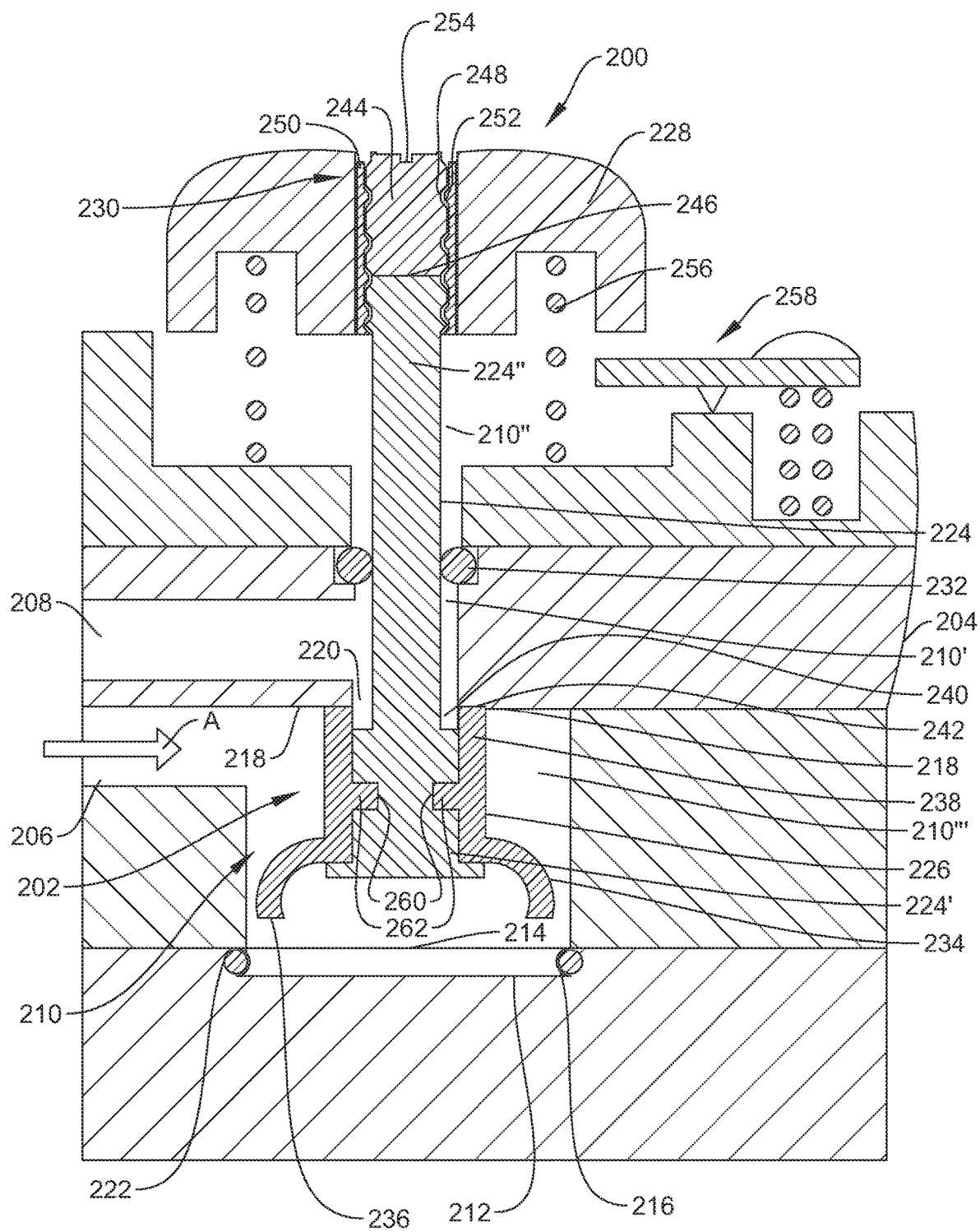
FIG. 2 is a sectional view of a normally closed valve having a mechanical closure delay system, constructed and operative in accordance with some other embodiments of the present invention, utilizing the principles of construction and operation described in connection with FIG. 1, in a close orientation.

FIG. 2 is a sectional view of a normally-closed valve having a closure delay system and method, constructed and operative in accordance with preferred embodiments of the present invention, utilizing the principles of formation, construction and operation described above in connection with FIG. 1, in a normally-closed orientation. FIG. 2 shows a valve having a closure delay system generally referenced 200 and a closure delay mechanism generally referenced 202. Valve 200 comprises a housing 204 including a liquid inlet chamber 206 defined in the housing having an inlet opening in the outside wall of the housing, a liquid outlet chamber 208 defined in the housing having an outlet opening in the outside wall of the housing and a passage 220 defined in the housing therebetween, all in flow communication in the open orientation of the valve. In FIG. 2 arrow "A" indicates inflow of liquid into the valve. Housing 204 further includes a cavity 210 defined in the housing having a cavity first upper portion 210' in flow communication with outlet chamber 208 in the valve open orientation (not shown), a cavity second upper portion 210" separated from cavity first upper portion 210' by an actuator seal 232, and a cavity lower portion 210''' in flow communication with inlet chamber 206. Cavity lower portion 210" comprises a cavity bottom wall 212 having a top suction surface 214 and a cavity top wall 218. Cavity first upper portion 210' and cavity lower portion 210" are in flow communication through passage 220 in the open orientation of the valve (not shown). Additionally, cavity 210 is adapted and configured to hold closure delay mechanism 202 disposed therein. Optionally, cavity bottom wall 212 may be configured for replacement by another cavity bottom wall selected from a group consisting of cavity bottom walls having different top surface textures. Additionally, cavity bottom wall 212 may include a circumferential groove 216 for holding a cavity seal 222 disposed therein for sealing cavity lower portion 212'.

Closure delay mechanism 202 includes an actuator shaft 224 having a lower portion 224' and an upper portion 224", a suction cup 226 and an actuation button 228. Actuator shaft lower portion 224' is fixedly coupled substantially to the center of suction cup 226 and actuation button 228 is rotatably coupled to an adjusting mechanism indicated generally by the reference character 230. The adjusting mechanism is coupled to actuator shaft upper portion 224" for presetting the longitudinal position of actuator shaft 224 in the cavity prior to actuation, thereby adjusting the delay time period as will be described below.

Actuator shaft 224 is disposed in cavity 210 wherein the actuator shaft lower portion 224' and suction cup 226 affixed thereto are disposed in cavity lower portion 210', and actuator shaft upper portion 224" is disposed in cavity first and second upper portions 210' and 210", respectively, whereas actuation button 228 rotatably coupled to adjusting mechanism 230 projects outside cavity second upper portion 210". Additionally, cavity first and second upper portions 210' and 210", respectively, are adapted and configured for disposing therebetween actuator seal 232 in sealing engagement with the peripheral wall of actuator shaft 224 and with inner wall of cavity 210 at a point where actuator seal 232 seals liquid passage between the cavity first upper portion and the cavity second upper portion yet allows cavity first upper portion 210' to be in flow communication with outlet chamber 208 in open and closed orientations of the valve and with inlet chamber 206 only in open orientation of the valve (not shown).

Suction cup 226 comprises a flexible, resilient curved lower portion having a bell-like shape curved wall 234 (illustrated in FIG. 2 in the non-compressed shape when the valve is in a normally-closed orientation), ending in a soft sealable bottom rim 236. Suction cup 226 further comprises an upper portion neck 238 having a neck opening 240 defined by the inside wall of neck upper portion 238 which is sized and configured for receiving actuator shaft lower portion 224' for affixed coupling to substantially the center of suction cup 226.

A top rim 242 of neck upper portion 238 is configured and sized for sealing engagement with cavity top wall 218 in the normally closed orientation of the valve, sealing passage 220 as shown in FIG. 2, thereby blocking the liquid flow between inlet chamber 206 and outlet chamber 208 of the valve. As described in the foregoing, the bottom rim 236 of the suction cup is made of elastic, flexible material such as elastomeric materials including but not limited to silicone rubber.

Adjusting mechanism 230 comprises a cylindrical adjusting head 244 a first end of which is fixedly coupled to a top end 246 of actuator shaft 224 and includes external screw threads 248, and a cylindrical sleeve 250 disposed in actuation button 244 and includes internal screw threads 252 complementary to the external screw threads 248 of the adjusting head, for rotationally coupling thereto. It will be appreciated that adjusting head 244 can be integrally formed with actuator shaft upper portion 224". Internal screw threads 252 and complementary external screw threads 248 are so configured that when adjusting head 244 is rotated relative to actuation button 228 in a first direction actuator shaft 224 moves longitudinally downward in cavity 210 and is positioned lower in the cavity prior to actuation, and when rotated in the direction opposite to the first direction actuator shaft 224 moves upwardly in cavity 210 and is positioned higher in the cavity than in the first direction of rotation, prior to actuation. Optionally, the same can be accomplished by rotating actuation button 228. Additionally, a second end of adjusting head 244 may include a groove 254 configured to allow for rotating adjusting head 244 by means of a screw driver, thereby causing reciprocal longitudinal motion of actuator shaft 224 in the valve.

Figure 3:
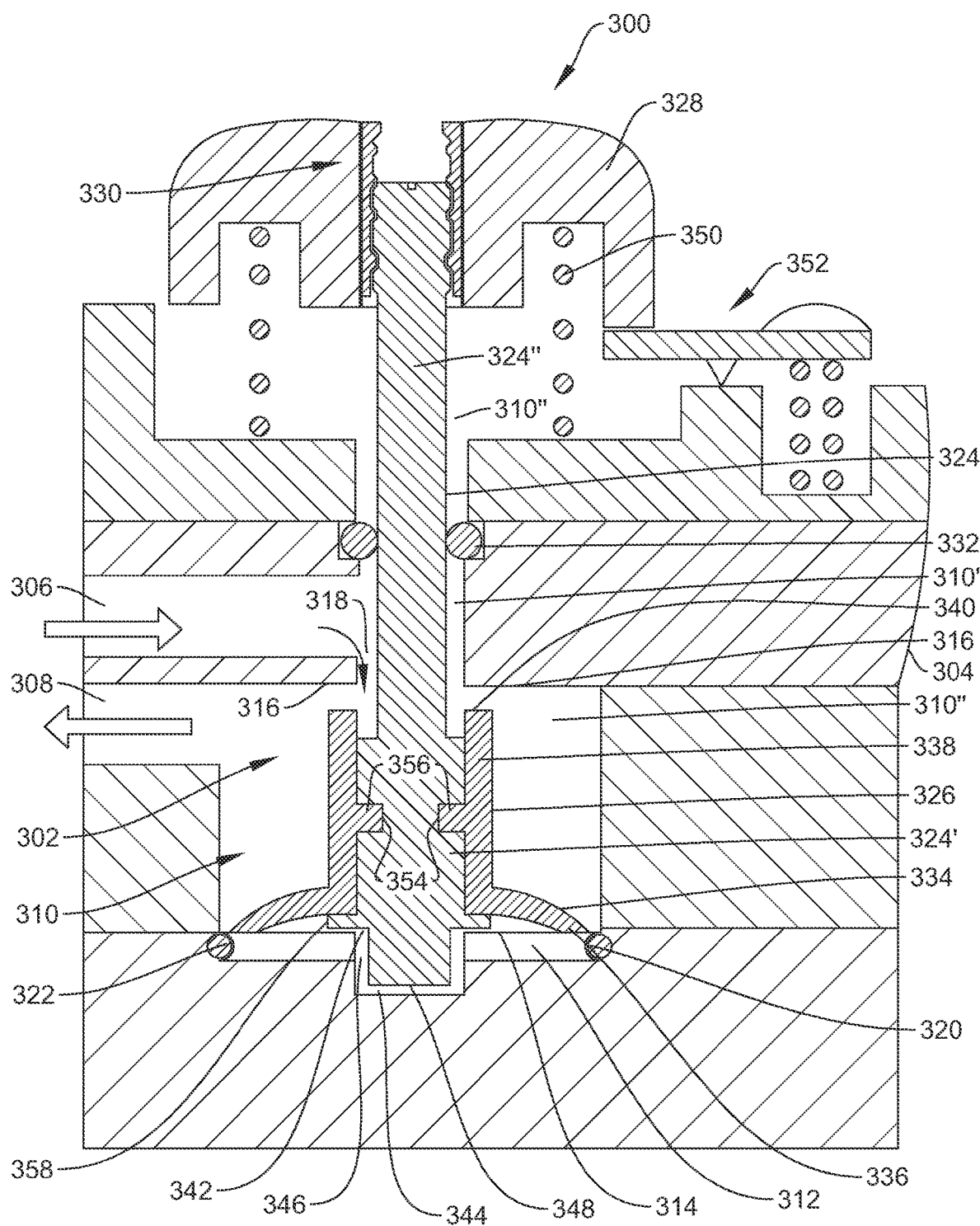
FIG. 3 is a sectional view of a normally closed valve having a mechanical closure delay system of FIG. 2, constructed and operative in accordance with some embodiments of the present invention, in an open orientation.

Preferably, in order to adjust the delay mechanism so as to increase the closure delay time of the valve according to an embodiment of the present invention, adjusting head 244 is rotated in a direction which moves actuator shaft 224 longitudinally downward thereby positioning it lower inside cavity 210 (as illustrated in FIG. 3 and described in detail below). At this position of actuator shaft 224, when pressure is applied to actuation button 228 the actuator shaft moves lower in the cavity than prior to the rotation of the adjusting head thereby allowing for greater compression of suction cup 226 against top suction surface 214 and as a result a stronger adherence of the suction cup to the suction surface. Such stronger adherence provides for a longer time for the suction cup to return to its bell-like curved shape, thus the closure of the valve is delayed for a longer time. In open orientation of the valve, the degree of flatness of the suction cup as a result of compression by the actuator shaft determines the force of adherence of the suction cup to the suction surface, thereby the period of time that is required for the suction cup to automatically reassume its bell-like curved shape, disengage the suction surface and sealingly reengage the cavity top wall, thus the period of time that the valve remains in open orientation.

Optionally, according to preferred embodiments of the invention as illustrated in FIG. 2, closure delay mechanism 202 may include an actuator coil spring 256 seated in housing 204 and engaging actuation button 228. Actuator coil spring 256 is utilizing similar principles of formation, construction and operation as described above in connection with actuator coil spring 94 illustrated in FIG. 1, thus for the sake of simplicity a detailed description of actuator coil spring 256 will be omitted.

Optionally, according to preferred embodiments of the invention, valve 200 may further include a deactivating mechanism indicated in FIG. 2 generally by the reference character 258, comprising a deactivating lever, a push button and a deactivating coil spring. Deactivating mechanism 258 is utilizing similar principles of formation, construction and operation as described above in connection with deactivating lever 100 illustrated in FIG. 1, thus for the sake of simplicity the detailed description of the deactivating mechanism 258 will be omitted.

Preferably, according to preferred embodiments of the invention as illustrated in FIG. 2, actuator shaft 224 may include at least one recess 260 defined in actuator shaft lower portion 224' and at least one inward protrusion 262 defined in suction cup 226 and configured to be seated in the recess for firmly affixing the suction cup to the actuator shaft. Recess 260 and protrusion 262 are utilizing similar principles of formation, construction and operation as described above in connection with recess 60 and protrusion 58, respectively, as illustrated in FIG. 1, thus for the sake of simplicity the detailed description of recess 260 and protrusion 262 will be omitted.

Optionally, according to preferred embodiments of the invention as illustrated in FIG. 2, actuator shaft 224 may include a support flange 264 defined in the actuation shaft lower portion 224', disposed inside suction cup 226 and configured for pushing up the suction cup to sealingly engage cavity top wall 218 thereby sealing passage 220, when the suction cup is springing automatically back to its bell-like shape or when a user operates deactivation mechanism 258, thereby urging actuator shaft 224 to retract to its non-operational position thus closing the valve.

Referring now to FIG. 3, there is shown a sectional view of a normally-closed valve having a closure delay system and method, constructed and operative in accordance with preferred embodiments of the present invention, utilizing the principles of formation, construction and operation described above in connection with FIG. 1, in open orientation. FIG. 3 illustrates a valve having a closure delay system generally referenced 300 and a closure delay mechanism generally referenced 302. Valve 300 comprises a housing 304 including a liquid inlet chamber 306 defined in the housing having an inlet opening in the outside wall of the housing, a liquid outlet chamber 308 defined in the housing having an outlet opening in the outside wall of the housing and a passage 318 defined in the housing therebetween, all in flow communication in the open orientation of the valve, as shown. It will be appreciated that inlet chamber 306 and outlet chamber 308 are interchangeable, i.e. inlet chamber 306 may be configured as an outlet chamber and outlet chamber 308 may be configured as an inlet chamber.

Housing 304 further includes a cavity 310 defined in the housing having a cavity first upper portion 310' in flow communication with inlet chamber 306, a cavity second upper portion 310" separated from cavity first upper portion 310' by an actuator seal 332, and a cavity lower portion 310'" in flow communication with outlet chamber 308. Cavity lower portion 310'" comprises a cavity bottom wall 312 having a top suction surface 314 and a cavity top wall 316. Cavity first upper portion 310' and cavity lower portion 310'" are in flow communication through passage 318 in open orientation of the valve. Additionally, cavity 310 is adapted and configured to hold closure delay mechanism 302 disposed therein. Optionally, cavity bottom wall 312 may be configured for replacement by another cavity bottom wall selected from a group consisting of cavity bottom walls having different top surface textures. Additionally, cavity bottom wall 312 may include a circumferential groove 320 for holding a cavity seal 322 disposed therein for sealing cavity lower portion 312'".

Closure delay mechanism 302 includes an actuator shaft 324 having a lower portion 324' and an upper portion 224", a suction cup 326 and an actuation button 328. Actuator shaft lower portion 324' is fixedly coupled substantially to the center of suction cup 326 and actuation button 328 is rotatably coupled to an adjusting mechanism indicated generally by the reference character 330. The adjusting mechanism is coupled to actuator shaft upper portion 324" for adjusting the longitudinal distance of motion of actuator shaft 324 in the cavity thereby adjusting the delay time period.

Adjusting mechanism 330 is utilizing similar principles of formation, construction and operation as described above in connection with adjustment mechanism 230 illustrated in FIG. 2, and therefore, for the sake of simplicity a detailed description of the adjusting mechanism 330 as illustrated in FIG. 3, will be omitted.

Actuator shaft 324 is disposed in cavity 310 wherein the actuator shaft lower portion 324' and suction cup 326 affixed thereto are disposed in cavity lower portion 310''', and actuator shaft upper portion 324" is disposed in cavity first and second upper portions 310' and 310", respectively, whereas actuation button 328 rotatably coupled to adjusting mechanism 230 projects outside cavity second upper portion 310". Additionally, cavity first and second upper portions 310' and 310", respectively, are adapted and configured for disposing therebetween actuator seal 332 in sealing engagement with the peripheral wall of actuator shaft 324 and with inner wall of cavity 310 at a point where actuator seal 332 seals liquid passage between the cavity first upper portion and the cavity second upper portion yet allows cavity first upper portion 310' to be in flow communication with inlet chamber 306 and with outlet chamber 308 through passage 318 in open orientation of the valve as shown.

Suction cup 326 comprises a flexible, resilient curved lower portion having a bell-like shape curved wall 334 ending in a soft sealable bottom rim 336 which is illustrated in FIG. 3 in a flattened shape as it is being compressed in the open orientation of the valve. Suction cup wall 334 is formed, constructed and operational as described above in connection with FIG. 1. Suction cup 326 further comprises an upper portion neck 338 formed, constructed and operational as described above in connection with FIG. 1. A top rim 340 of neck upper portion 338 is configured and sized for sealing engagement with cavity top wall 316 in the normally-closed orientation of the valve (not shown).

Optionally, cavity bottom wall 312 may include a bottom opening 342. Optionally, housing 304 may include a bore 344 in the lower portion of housing 304 having a bore opening 346 in registration with bottom opening 342 in cavity bottom wall 312. The bore and its opening are sized and configured for allowing a bottom end 348 of actuator shaft 324 to pass through the bore opening and be seated in the bore when a user applies pressure to actuation button 328 to switch the valve from a normally-closed orientation to an open orientation, thereby pressure is applied to actuator shaft 324 causing it to move longitudinally downward in the cavity. Thus, in the open orientation (as shown in FIG. 3), actuator shaft bottom end 348 is seated in bore 344 thereby obtaining greater stability of the actuator shaft in the cavity.

Optionally, delay valve 300 may further include an actuator coil spring 350, a deactivation mechanism 352, a recess 354 defined in the actuator shaft lower portion of 324' and an inward protrusion 356 defined in suction cup 326, and a support flange 358 defined in actuator shaft lower portion of 324', all are utilizing similar principles of formation, construction and operation as described above in connection with actuator coil spring 94, recess 60, inward protrusion 58 and support flange 114 illustrated in FIG. 1, thus, for the sake of simplicity a detailed description of the actuator coil spring, recess, inward protrusion and support flange as illustrated in FIG. 3, will be omitted.

General Comments:

The terms "comprises", "comprising", "includes", "including", "having" and their conjugates mean "including but not limited to".

As used herein, the singular form "a", "an" and "the" include plural references unless the context clearly indicates otherwise.

The section headings used herein are intended only as informative and as a convenience for the reader, and they should not be construed as limiting the scope of the description in any way.

Although the invention has been described in conjunction with specific embodiments thereof, it is evident that many alternatives, modifications and variations will be apparent to those skilled in the art. Accordingly, it is intended to embrace all such alternatives, modifications, and variations that fall within the spirit and broad scope of the appended claims.

What is claimed is:

1. A method for delaying closure of a normally-closed valve having a closure delay system, comprising:
   providing a housing;
   defining in the housing a liquid inlet chamber including an inlet opening in an outside wall of the housing, a liquid outlet chamber having an outlet opening in the outside wall of the housing, a passage between the inlet chamber and the outlet chamber and a cavity comprising a bottom wall having a top suction surface and a cavity top wall, wherein the cavity is in flow communication with the inlet chamber, the outlet chamber and the passage when the valve is in an open orientation;
   providing a closure delay mechanism comprising an actuator shaft having a lower portion and an upper portion, and a suction cup;
   fixedly coupling the actuator shaft lower portion to the suction cup wherein the suction cup is adapted and configured to open and close the passage;
   disposing the actuator shaft and the suction cup in the cavity wherein the cavity is adapted and configured for longitudinal downward reciprocating movement of the actuator shaft and the suction cup therein;
   sealingly engaging the cavity top wall by the suction cup when the valve is in a normally-closed orientation;
   moving the actuator shaft longitudinally downward by applying pressure to the actuator shaft when switching the valve from the normally-closed orientation to the open orientation, wherein the suction cup disengages the cavity top wall, engages the top suction surface and adheres thereto thus opening the passage;
   automatically disengaging the suction cup from the top suction surface a preset time period after pressure is ceased to be applied to the actuator shaft, wherein the suction cup sealingly reengages the cavity top wall thereby closing the passage thus switching the valve from the open orientation to the normally-closed orientation.

2. A method for delaying closure of a normally-closed valve having a closure delay system according to claim 1, further comprising:
   providing a closure delay adjusting mechanism for adjusting the longitudinal downward distance of movement of the actuator shaft in the cavity prior to actuation, thereby adjusting the preset time period, wherein the closure delay adjusting mechanism includes an adjustment rod having a tapered portion, a non-tapered portion and a cylindrical coupling shank, the coupling shank including external screw threads;

providing an adjusting body having a cylindrical complementary coupling slot, the coupling slot including an internal wall having screw threads matching the coupling shank external screw threads for coupling the adjusting body to the coupling shank, wherein the adjusting body is configured to be rotated;

disposing the closure delay adjusting mechanism in a tunnel defined in a lower portion of the housing, the tunnel extending substantially horizontally from an adjustment opening in the outside wall of the housing to a point substantially under a bottom opening in the cavity bottom wall, wherein the tunnel is having a tunnel opening in an upper wall of the tunnel, in registration with the bottom opening;

moving actuator shaft lower portion reciprocally through the tunnel opening for abutting the adjustment rod when the valve is actuated to switch from the normally-closed orientation to the open orientation;

positioning prior to actuation the tapered portion under the tunnel opening by rotating the adjusting body in a first direction, thereby allowing the actuator shaft to move longitudinally downward a longer distance than when the non-tapered portion is positioned under the tunnel opening by rotating the adjusting body in the opposite direction; and exerting greater compression to the suction cup thereby increasing the preset time period of the closure delay of the valve.

3. A method for delaying closure of a normally-closed valve having a closure delay system according to claim 1, further comprising:

providing a closure delay adjusting mechanism for presetting the longitudinal position of the actuator shaft in the cavity prior to actuation, thereby adjusting the valve closure delay time, wherein the closure delay adjusting mechanism includes a cylindrical adjusting head including external screw threads, the cylindrical adjusting head being fixedly coupled to the actuator shaft upper portion, a cylindrical sleeve including internal screw threads complementary to the external screw threads of the adjusting head for rotational coupling thereto, the cylindrical sleeve being disposed in the actuation button;

rotationally disposing the cylindrical adjusting head is in the cylindrical sleeve;

moving the actuator shaft longitudinally downward in the cavity by rotating the cylindrical adjusting head relative to the actuation button in a first direction, thereby positioning the actuator shaft prior to actuation lower in the cavity, than when moving actuator shaft upwardly in the cavity by rotating the cylindrical adjusting head relative to the actuation button in a direction opposite to the first direction, thereby positioning the actuator shaft higher in the cavity; and exerting greater compression to the suction cup thereby increasing the preset time period of the closure delay of the valve.

4. A normally-closed valve having a closure delay system, comprising:

a housing;

a liquid inlet chamber defined in the housing including an inlet opening in an outside wall of the housing, a liquid outlet chamber defined in the housing having an outlet opening in the outside wall of the housing and a passage defined in the housing between the inlet chamber and the outlet chamber; and a cavity defined in the housing in flow communication with the inlet chamber, the outlet chamber and the passage when the valve is in an open orientation, the cavity comprising a bottom wall having a top suction surface and a cavity top wall;

a closure delay mechanism comprising an actuator shaft having a lower portion and an upper portion, and a suction cup, the actuator shaft lower portion fixedly coupled to the suction cup and the suction cup being adapted and configured to open and close the passage;

wherein the actuator shaft and the suction cup are disposed in the cavity being adapted and configured for longitudinally downward reciprocating movement of the actuator shaft and the suction cup therein; and wherein the suction cup is sealingly engaging the cavity top wall when the valve is in a normally-closed orientation thereby closing the passage; disengaging the cavity top wall and engaging the top suction surface and adhering thereto when the actuator shaft moves longitudinally downward by pressure applied thereto for switching the valve from the normally-closed orientation to the open orientation thereby opening the passage; automatically disengaging the top suction surface a preset time period after pressure ceases to be applied to the actuator shaft and sealingly reengaging the cavity top wall thereby closing the passage and switching the valve from the open orientation to the normally-closed orientation.

5. A normally-closed valve having a closure delay system according to claim 4, wherein the suction cup further comprises a flexible, resilient lower portion having a bell-like shape curved wall configured to engage the top suction surface and adhering thereto and a neck upper portion having a top rim being configured to sealingly engage and disengage the cavity top wall.

6. A normally-closed valve having a closure delay system according to claim 5, wherein the bell-like shape curved wall is having a soft sealable bottom rim ending.

7. A normally-closed valve having a closure delay system according to claim 5, wherein the neck upper portion is having a neck opening defined by the inside wall of the neck upper portion, sized and configured for receiving the actuator shaft lower portion for affixed coupling to substantially the center of the suction cup.

8. A normally-closed valve having a closure delay system according to claim 7, further comprising:

at least one recess defined in the actuator shaft lower portion; and at least one inward protrusion defined in the suction cup and configured to be seated in the recess for firmly affixing the suction cup to the actuator shaft.

9. A normally-closed valve having a closure delay system according to claim 8, wherein the recess is being circumferentially defined in the actuator shaft lower portion and the inward protrusion being circumferentially inwardly defined in the suction cup and configured to be seated in the circumferential recess and wherein the inward protrusion is being integrally formed with the suction cup.

10. A normally-closed valve having a closure delay system according to claim 7, wherein a support flange defined in the actuation shaft lower portion and disposed inside the suction cup, the support flange is configured to push up the suction cup to sealingly engage the cavity top wall when the suction cup springs back to the original bell-like shape or when pressure is applied to the a deactivating lever, thereby closing the valve.

11. A normally-closed valve having a closure delay system according to claim 4, wherein the cavity further comprises:
   a cavity first upper portion in flow communication with the inlet chamber;
   a cavity second upper portion separated from the cavity first upper portion by an actuator seal disposed therebetween; and
   a cavity lower portion including the cavity bottom wall and the cavity top wall;
   wherein the cavity first upper portion, the cavity lower portion, the inlet chamber, the outlet chamber and the passage are in flow communication when the valve is in the open orientation.

12. A normally-closed valve having a closure delay system according to claim 11, wherein the cavity bottom wall is configured for replacement by a cavity bottom wall, a top suction surface texture of which is selected from a group consisting of flat, smooth, nonporous, porous, rigid, permeable, rough or uneven textures;
   wherein each of said top suction surface texture provides a different degree of adherence of the suction cup to the top suction surface, resulting in different periods of time for the suction cup to reassume its original bell-like curved shape in the rest position thus the valve to close; and
   wherein the cavity bottom wall includes a circumferential groove for holding a cavity seal disposed therein for sealing the cavity lower portion.

13. A normally-closed valve having a closure delay system according to claim 11, wherein the cavity bottom wall include a bottom opening.

14. A normally-closed valve having a closure delay system according to claim 4, wherein the closure delay mechanism further comprises an actuation button fixedly coupled to the actuator shaft upper portion or integrally formed therewith, and projecting from the cavity second upper portion for applying pressure to the actuator shaft when switching the valve from the normally-closed orientation to the open orientation.

15. A normally-closed valve having a closure delay system according to claim 4, wherein the closure delay mechanism further comprises an actuator coil spring having a first end seated in or on the housing and a second end engaging the an actuation button; and
   wherein the actuator coil spring is biased when pressure is applied to the actuation button to switch the valve from the normally-closed orientation to the open orientation thereby generating a recoil tension urging the closure delay mechanism to return to an original rest position and the valve to the normally-closed orientation.

16. A normally-closed valve having a closure delay system according to claim 4, further comprising:
   a closure delay adjusting mechanism for adjusting the longitudinal downward distance of movement of the actuator shaft in the cavity prior to actuation, thereby adjusting the preset time period, the delay adjusting mechanism comprising:
   an adjustment rod having a tapered portion, a non-tapered portion and a cylindrical coupling shank, the coupling shank including external screw threads;
   an adjusting body having a cylindrical complementary coupling slot, the coupling slot including an internal wall having screw threads matching the coupling shank external screw threads, for coupling the adjusting body to the coupling shank, the adjusting body configured to be rotated;
   wherein the closure delay adjusting mechanism is disposed in a tunnel defined in a lower portion of the housing, extending substantially horizontally from an adjustment opening in the outside wall of the housing to a point substantially under the bottom opening of the cavity bottom wall, the tunnel having a tunnel opening in an upper wall of the tunnel, in registration with the bottom opening, sized and configured for allowing the actuator shaft lower portion to move reciprocally through the tunnel opening for abutting the adjustment rod when the valve is actuated to switch from the normally-closed orientation to the open orientation; and
   wherein the tapered portion is positioned under the tunnel opening by rotating the adjusting body in a first direction, thereby allowing the actuator shaft to move longitudinally downward a longer distance, thus exerting greater compression to the suction cup, than when the non-tapered portion is positioned under the tunnel opening by rotating the adjusting body in a direction opposite the first direction, thereby increasing the preset time period of the closure delay of the valve.

17. A normally-closed valve having a closure delay system according to claim 16, wherein the adjusting body includes a circumferential groove and an adjusting seal disposed therein, for sealing the tunnel.

18. A normally-closed valve having a closure delay system according to claim 4, further comprising a deactivating mechanism comprising a deactivating lever, the lever being pivotally mounted in or on the housing;
   wherein a first end of the deactivating lever extends under the actuation button; and
   wherein applying pressure to a second end of the deactivating lever when the valve is in the open orientation, the first end of the deactivating lever configured to operatively engage and push against the actuation button thereby overcoming the suction force adhering the suction cup to the top suction surface urging the valve to return to the normally-closed orientation.

19. A normally-closed valve having a closure delay system according to claim 18, wherein the deactivation mechanism further comprises:
   a push button affixed to the deactivating lever second end; and
   a deactivating coil spring having a first end seated in or on the housing and a second end engaging a bottom wall of the deactivating lever, for biasing the deactivating lever to retract to the original non-operative position when the valve is in the normally-closed orientation.

20. A normally-closed valve having a closure delay system according to claim 4, further comprising:
   a closure delay adjusting mechanism for presetting the longitudinal position of the actuator shaft in the cavity prior to actuation, thereby adjusting the preset time period, the delay adjusting mechanism comprising:
   a cylindrical adjusting head including external screw threads, cylindrical adjusting head being fixedly coupled to the actuator shaft upper portion;
   a cylindrical sleeve including internal screw threads complementary to the external screw threads of the adjusting head for rotational coupling thereto, the cylindrical sleeve being disposed in the actuation button;

wherein the cylindrical adjusting head is rotationally disposed in the cylindrical sleeve and so configured that when the cylindrical adjusting head is rotated relative to the actuation button in a first direction the actuator shaft moves longitudinally downward in the cavity and is positioned lower therein than when cylindrical adjusting head is rotated in a direction opposite to the first direction thereby moving actuator shaft upwardly in the cavity and is positioned higher therein, thereby exerting greater compression to the suction cup thus increasing the closure delay time of the valve.

21. A normally-closed valve having a closure delay system according to claim 20, wherein the adjusting head is being integrally formed with the actuator shaft upper portion.

22. A normally-closed valve having a closure delay system, comprising:
- a housing including:
  - a liquid inlet chamber, a liquid outlet chamber and a passage therebetween; and
  - a cavity in flow communication with the inlet chamber, the outlet chamber and the passage when the valve is in an open orientation, the cavity comprising a suction surface and a cavity top wall;
- a closure delay mechanism comprising an actuator shaft and a suction cup, the actuator shaft fixedly coupled to the suction cup and the suction cup comprises a flexible, resilient lower portion having a bell-like shape curved wall ending in a soft sealable bottom rim, and an upper portion neck having a top rim being adapted and configured to open and close the passage;
- wherein the actuator shaft and the suction cup are disposed in the cavity which is adapted and configured for allowing reciprocating longitudinal movement of the actuator shaft and the suction cup in the cavity;
- wherein the suction cup is further adapted and configured for sealing engagement with the cavity top wall when the valve is in a normally-closed orientation thereby closing the passage; for disengagement from the cavity top wall and engagement of the suction surface and adherence thereto when pressure is applied to the actuator shaft for switching the valve from the normally-closed orientation to the open orientation thereby opening the passage; and for automatic disengagement from the suction surface and detachment therefrom and sealing reengagement with the cavity top wall thereby closing the passage; and
- wherein, the closure delay system is configured so as to maintain the normally-closed valve at the open orientation for a preset time during which liquid flows through the valve from the time the valve is actuated until the valve automatically shuts off following the lapse of the preset time period.

\* \* \* \* \*